(12) United States Patent
Hill

(10) Patent No.: US 8,727,284 B2
(45) Date of Patent: May 20, 2014

(54) TURBINE POWERED ELECTROMECHANICAL ACTUATION SYSTEM

(75) Inventor: David G. Hill, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1154 days.

(21) Appl. No.: 12/692,269

(22) Filed: Jan. 22, 2010

(65) Prior Publication Data

US 2013/0292519 A1    Nov. 7, 2013

(51) Int. Cl.
 *B64G 1/40*    (2006.01)

(52) U.S. Cl.
 USPC .......... 244/171.2; 244/171.1; 60/228; 60/230

(58) Field of Classification Search
 USPC .............. 244/171.2, 171.1, 3.1, 164; 60/228, 60/230, 204, 229, 231
 See application file for complete search history.

(56) References Cited

U.S. PATENT DOCUMENTS

| | | | |
|---|---|---|---|
| 3,617,014 A * | 11/1971 | Warren | 244/3.1 |
| 3,636,710 A * | 1/1972 | Lovingham et al. | 60/231 |
| 4,786,019 A | 11/1988 | Uken | |
| 4,894,986 A | 1/1990 | Etheridge | |
| 5,003,772 A | 4/1991 | Huber | |
| 5,003,773 A | 4/1991 | Beckwith | |
| 5,014,507 A | 5/1991 | Rice et al. | |
| 5,560,559 A | 10/1996 | Larsen | |
| 5,816,539 A * | 10/1998 | Chan et al. | 244/159.4 |
| 6,622,472 B2 | 9/2003 | Plumpe, Jr. | |
| 7,012,233 B2 | 3/2006 | Brown et al. | |
| 7,281,367 B2 | 10/2007 | Rohrbaugh et al. | |
| 2003/0101712 A1 * | 6/2003 | Johnson et al. | 60/226.2 |
| 2008/0308671 A1 * | 12/2008 | Harnoy | 244/3.1 |
| 2009/0314895 A1 | 12/2009 | Even et al. | |
| 2010/0192539 A1 | 8/2010 | Cover et al. | |

FOREIGN PATENT DOCUMENTS

| | | |
|---|---|---|
| DE | 3929876 A1 | 9/1988 |
| EP | 1700785 A1 | 9/2006 |
| JP | 3-186500 A | 8/1991 |
| JP | 2006046332 A | 2/2006 |

OTHER PUBLICATIONS

Extended EP Search Report; European Patent Office, mailed May 3, 2011.

* cited by examiner

*Primary Examiner* — Christopher P Ellis
(74) *Attorney, Agent, or Firm* — Cantor Colburn LLP

(57) ABSTRACT

An electromechanical actuation system (10) for a space vehicle includes a propellant source (18) and at least one turbine (14) operably connected to the propellant source (18) and rotatable by a flow of propellant (16) therefrom. At least one electrical generator (20) is operably connected to the at least one turbine (14) and is configured to convert rotation of the turbine (14) into electrical energy. At least one electromechanical actuator (12) is operably connected to the at least one electrical generator (20) such that electrical energy from the at least one electrical generator (20) drives operation of the at least one electromechanical actuator (12). A method of operating a turbine powered electromechanical actuator (12) for a space vehicle includes rotating the at least one turbine (14) via a flow of propellant (16) therethrough. Electrical energy is generated in at least one electrical generator (20) operably connected to the at least one turbine (14) and the electromechanical actuator (12) is operated with the electrical energy generated therein.

20 Claims, 3 Drawing Sheets

TURBINE POWERED ELECTROMECHANICAL ACTUATION SYSTEM

BACKGROUND OF THE INVENTION

The subject matter disclosed herein generally relates to electromechanical actuators. More specifically, the subject disclosure relates to power and control systems for electromechanical actuators.

Electromechanical actuators are utilized in a variety of applications and environments. For example, space vehicles often employ thrust vector control of main engines during launch and/or maneuvering which requires a means to move the main engine nozzle. Previously, hydraulic actuation systems were used for this application, but such systems are complex and heavy, hydraulic fluids pose both a fire and environmental hazard, and also require maintenance and thermal conditioning prior to launch. Recently, electromechanical actuators have begun to replace hydraulic actuators in thrust vector control systems. Using electromechanical actuators reduces complexity by eliminating the hydraulic fluid system, but requires the addition of batteries or use of the vehicle's onboard electrical system to power the electromechanical actuators. On a space vehicle, physical space and vehicle weight is a premium, thus the addition of large, heavy batteries is undesirable. Further, the vehicle onboard electrical system is not sized to provide the electromechanical actuators with power, thus would have to be enlarged considerably to accommodate the electromechanical actuators.

The art would well receive an alternative system for providing power to electromechanical actuators for thrust vector control and other applications.

BRIEF DESCRIPTION OF THE INVENTION

According to one aspect of the invention, an electromechanical actuation system for a space vehicle includes a propellant source and at least one turbine operably connected to the propellant source and rotatable by a flow of propellant therefrom. At least one electrical generator is operably connected to the at least one turbine and is configured to convert rotation of the turbine into electrical energy. At least one electromechanical actuator is operably connected to the at least one electrical generator such that electrical energy from the at least one electrical generator drives operation of the at least one electromechanical actuator.

According to another aspect of the invention, a method of operating an electromechanical actuator for a space vehicle includes delivering a flow of propellant to at least one turbine from a propellant source and rotating the at least one turbine via the flow of propellant through the at least one turbine. Electrical energy is generated in at least one electrical generator operably connected to the at least one turbine via rotation of the at least one turbine. The electromechanical actuator is operated with the electrical energy generated in the at least one electrical generator.

According to yet another aspect of the invention, a thrust vector control system for a space vehicle main engine includes at least two electromechanical actuators operably connected to the main engine, at least one of the at least two electromechanical actuators configured to articulate the main engine in a first direction and at least one of the at least two electromechanical actuators configured to articulate the main engine in a second direction. The system further includes a propellant source and at least one turbine operably connected to the propellant source and rotatable by a flow of propellant therefrom. At least one electrical generator is operably connected to the at least one turbine and the at least two electromechanical actuators and is configured to convert rotation of the turbine into electrical energy which drives operation of the at least two electromechanical actuators.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
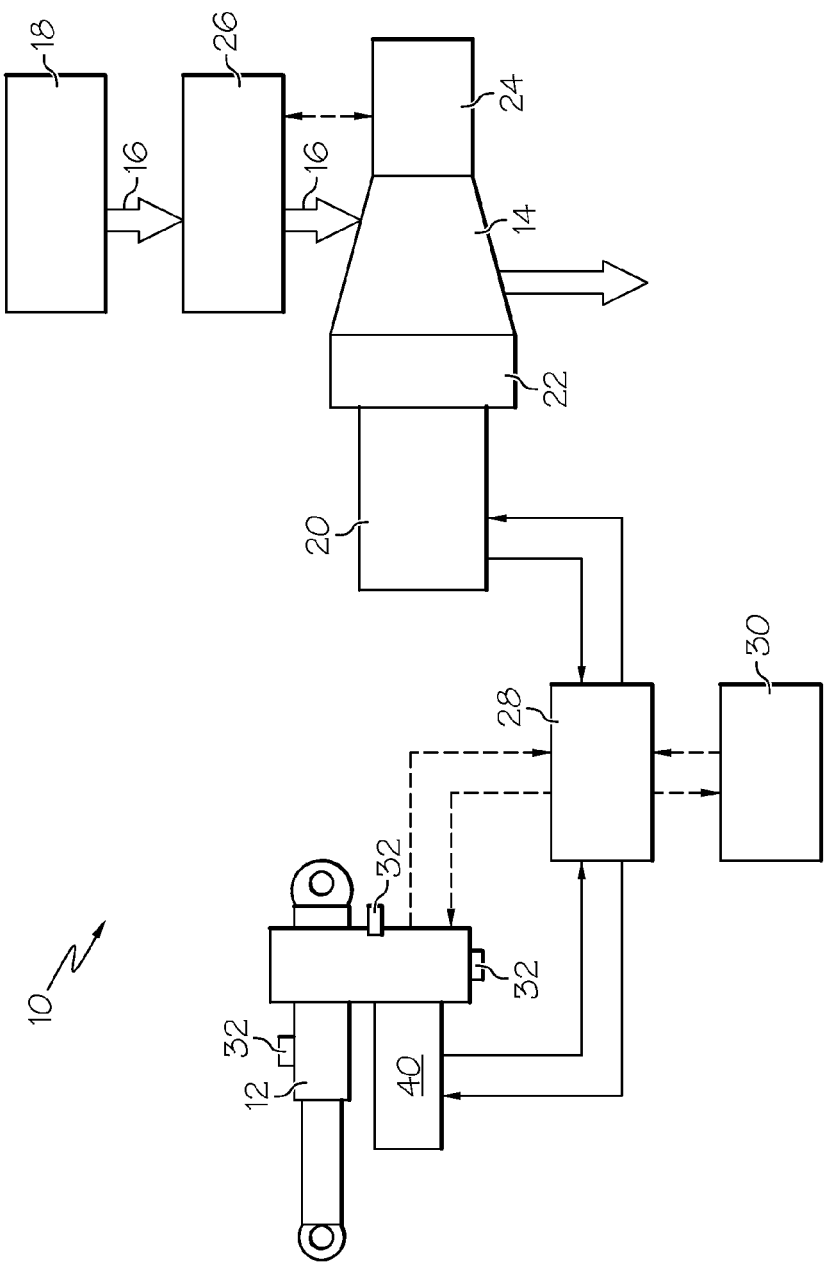
FIG. 1 is a schematic view of and embodiment of a turbine powered electromechanical actuation system.

Shown in FIG. 1 is a schematic view of an embodiment of a turbine powered electromechanical actuation (EMA) system 10. Such a system may be utilized for actuation of main engines of a space vehicle for thrust vector control and/or actuation of other components. The system includes an electromechanical actuator (EMA) 12 connected to a component to be actuated (not shown), which may be a spacecraft engine or other component. Such EMA 12 may be either linear to rotary. To provide electrical power to the EMA 12, a turbine 14 is provided. The turbine 14 is rotated by a flow of propellant 16. In some embodiments the propellant 16 is hydrogen gas which is exhausted from an onboard liquid propellant tank 18 repressurization system, the liquid propellant utilized to power the main engines. In other embodiments, the propellant 16 may be compressed helium or other gas, solid propellant gas generator or a liquid propellant such as hydrazine.

The propellant 16 rotates the turbine 14 which in turn rotates an electrical generator 20 connected to the turbine 14. Speed of rotation of the electrical generator 20 is controlled by a gearbox 22 disposed, for example, between the turbine 14 and electrical generator 20. Likewise, in some embodiments, rotation speed of the turbine 14 is controlled by a speed control device 24, for example, a governor 24 or other device connected to the turbine 14 and in communication with a propellant control valve 26 to control a rate of flow of the propellant 16. Rotation of the electrical generator 20 generates electrical power which is delivered to a system controller 28.

The system controller 28 may perform several functions, including power conditioning prior to delivery to the EMA 12 and communication with a vehicle flight computer 30. Further, the system controller 28 communicates with a plurality of EMA sensors 32 disposed at the EMA 12. The quantity of EMA sensors 32 utilized depends on the motor type and the position feedback requirements of the system. EMA sensors could those for motor commutation, position feedback, health monitoring and other uses. The plurality of EMA sensors 32 monitor position of the EMA 12 and to provide health monitoring of the EMA 12 to the vehicle flight computer 30. When commanded by the vehicle flight computer 30, the system controller 28 provides power to one or more motors 40 connected to the EMA 12 to actuate the EMA 12 and change position of the attached component.

Figure 2:
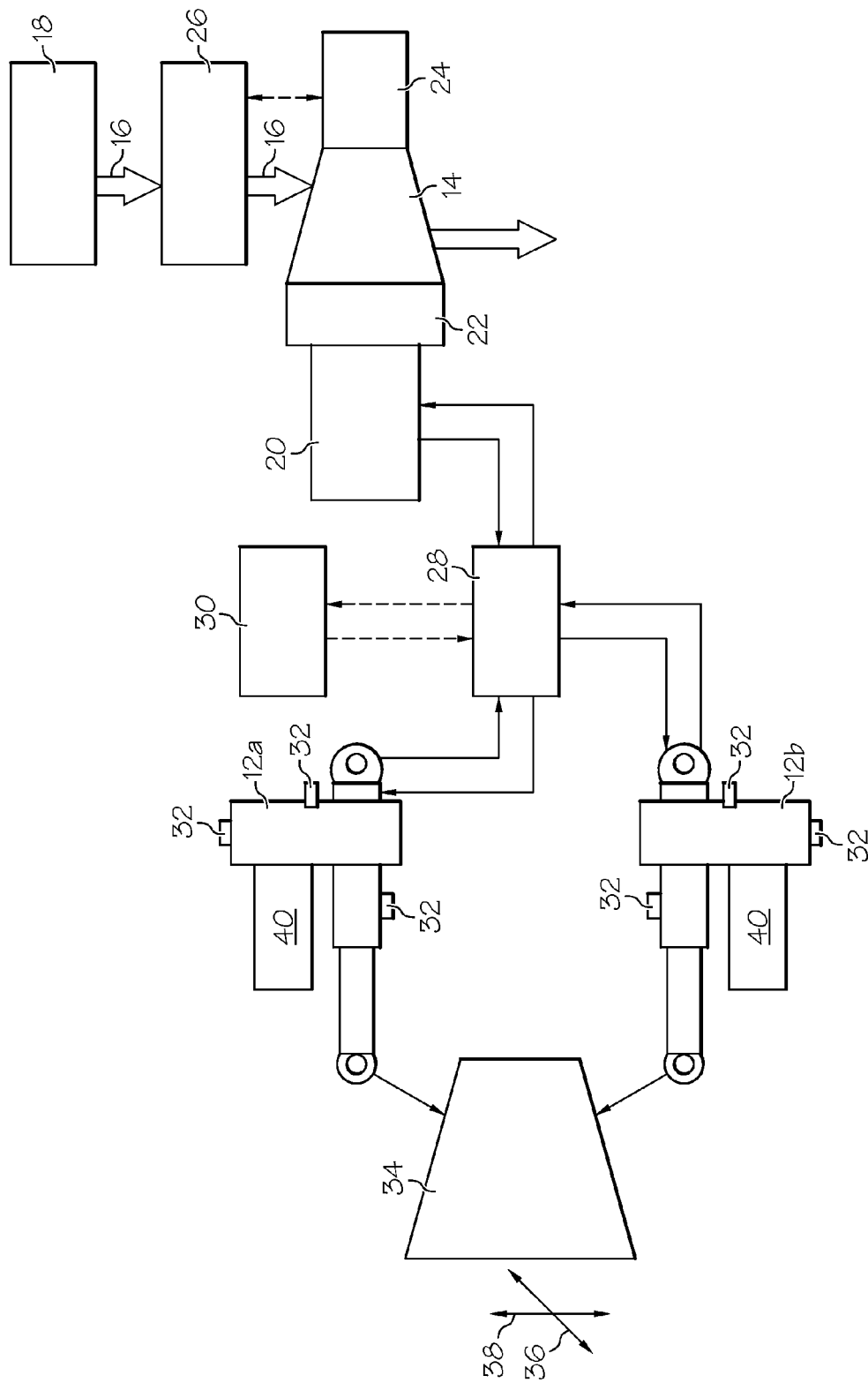
FIG. 2 is a schematic view of another embodiment of a turbine powered electromechanical actuation system.
Figure 3:
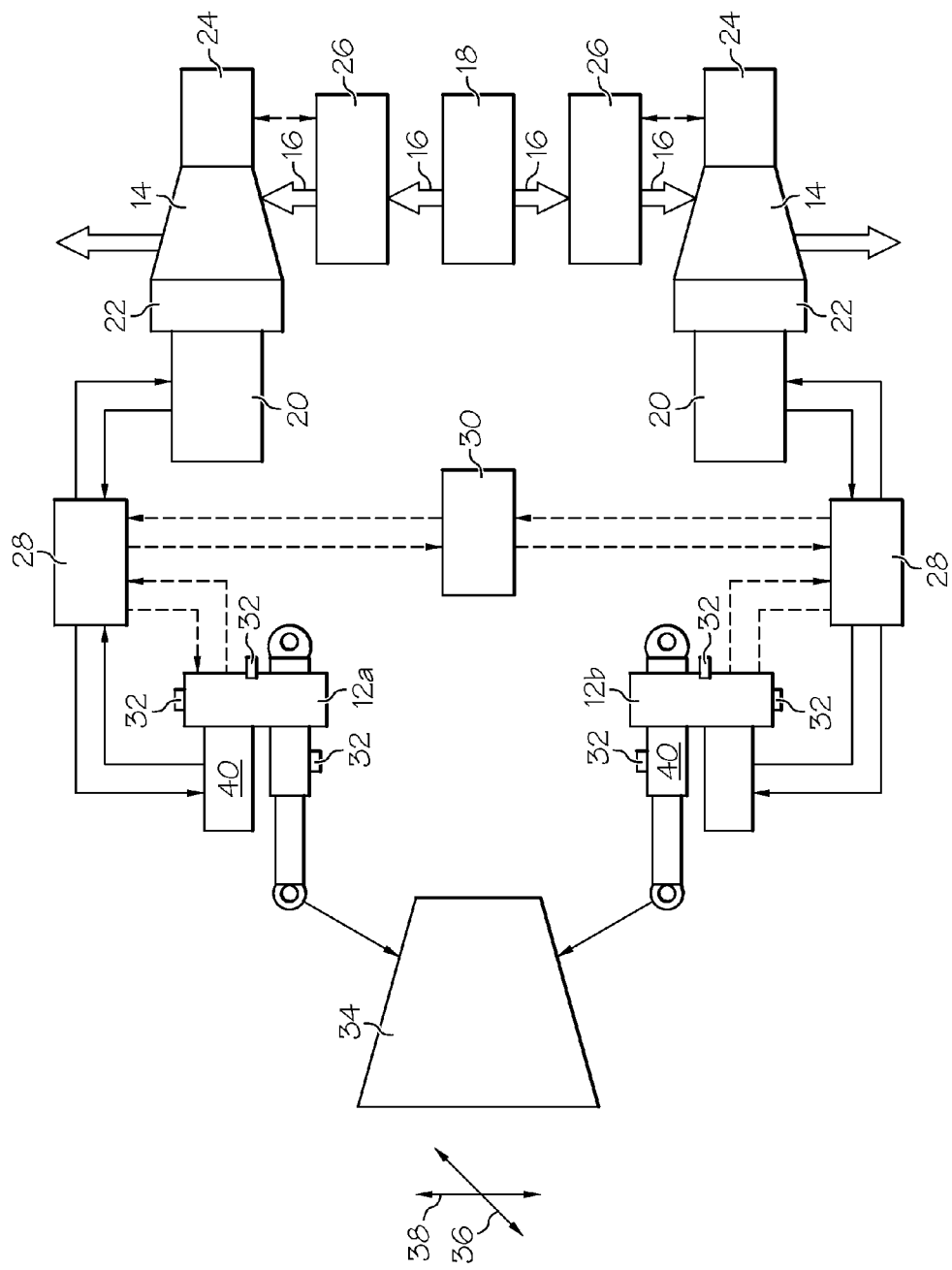
FIG. 3 is a schematic view of yet another embodiment of a turbine powered electromechanical actuation system.

Referring now to FIG. 2, a schematic view is shown utilizing two EMA's 12 to control thrust vectoring of a main engine 34 of a spacecraft. A first EMA 12a is utilized to control motion of the main engine 34 along a first axis 36 and a second EMA 12b is utilized to control motion of the main engine 34 along a second axis 38. As shown in FIG. 3, in some embodiments, EMA 12a and EMA 12b are controlled by independent system controllers 28 which are connected to separate turbines 14. In other embodiments, however, the EMA 12a and 12b may be powered by a single, shared, turbine 14 through a single system controller 28. Further, in other embodiments where redundancy of components is required, more than one, for example, two EMA's 12a and two EMA's 12b are connected to the main engine 34 to maintain operability of the EMA system 10 in case of a failure of one or more of the EMA's 12. Additionally, an EMA 12 with more than one motors 40 and multiple load paths could be used to provide EMA 12 redundancy. To further meet redundancy requirements of a particular system, and combination of system controllers 28 and turbines 14 may be interconnected to form the EMA system 10.

The herein described EMA system 10 provides electrical power to one of more EMA's 12 through the use of one or more turbines 14. Use of the one or more turbines 14 powered by propellant 16 from, for example, an onboard propellant tank 18 repressurization system provides a lightweight solution to replace the use of batteries to power the EMA's 12. Further, such a system eliminates the need to provide hydraulic fluid to power actuators thereby eliminating an environmental and fire hazard and further eliminating a need for pre-launch thermal conditioning of the hydraulic fluid and reducing associated hydraulic fluid system maintenance requirements.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electromechanical actuation system (10) for a space vehicle comprising:
   a propellant source (18);
   at least one turbine (14) in flow communication with the propellant source (18) and rotatable by a flow of propellant (16) therefrom;
   at least one electrical generator (20) operably connected to the at least one turbine (14) configured to convert rotation of the at least one turbine (14) into electrical energy; and
   at least one electromechanical actuator (12) operably connected to the at least one electrical generator (20) such that electrical energy from the at least one electrical generator (20) drives operation of the at least one electromechanical actuator (12).

2. The electromechanical actuation system (10) of claim 1 wherein the at least one electromechanical actuator (12) is at least two electromechanical actuators (12).

3. The electromechanical actuation system (10) of claim 1 wherein a discreet electrical generator (20) of the at least one electrical generator (20) is operably connected to each electromechanical actuator (12) of the at least one electromechanical actuator (12).

4. The electromechanical actuation system (10) of claim 1 wherein the flow of propellant (16) comprises one of a hydrogen gas vented from a liquid hydrogen propellant tank (18) repressurization system, compressed helium or other gas, solid propellant gas generator, or a liquid propellant.

5. The electromechanical actuation system (10) of claim 1 further comprising at least one system controller (28) operably connected to the at least one electrical generator (20) and configured to control flow of electrical energy to the at least one electromechanical actuator (12).

6. The electromechanical actuation system (10) of claim 5 wherein the at least one system controller (28) is operably connected to a vehicle flight computer (30).

7. The electromechanical actuation system (10) of claim 1 further comprising at least one governor (24) operably connected to the at least one turbine (14) to control rotation thereof.

8. The electromechanical actuation system (10) of claim 7 further comprising a propellant control valve (26) operably connected to the at least one governor (24) to control a flow rate of flow of propellant (16) into the at least one turbine (14).

9. A method of operating a turbine powered electromechanical actuator (12) for a space vehicle comprising:
   delivering a flow of propellant (16) to at least one turbine (14) from a propellant source (18);
   rotating the at least one turbine (14) via the flow of propellant (16) through the at least one turbine (14);
   generating electrical energy in at least one electrical generator (20) operably connected to the at least one turbine (14) via rotation of the at least one turbine (14); and
   operating the electromechanical actuator (12) with the electrical energy generated in the at least one electrical generator (20).

10. The method of claim 9 further comprising controlling a flow of electrical energy to the at least one electromechanical actuator (12) via at least one system controller (28) operably connected to the at least one electrical generator (20).

11. The method of claim 10 further comprising receiving commands from a vehicle flight computer (30) to direct the flow of electrical energy via the at least one system controller (28).

12. The method of claim 9 further comprising controlling rotation of the at least one turbine (14) via at least one speed control device (24) operably connected to the at least one turbine (14).

13. The method of claim 12 further comprising controlling a flow rate of the flow of propellant (16) into the at least one turbine (14) via a propellant control valve (26) operably connected to the at least one speed control device (24).

14. A thrust vector control system for a space vehicle main engine (34) comprising:
   at least two electromechanical actuators (12) operably connected to the main engine (34), one or more of electromechanical actuators (12) of the at least two electromechanical actuators (12) configured to articulate the main engine (34) in a first direction (36) and one or more electromechanical actuators (12) of the at least two electromechanical actuators (12) configured to articulate the main engine (34) in a second direction (38);
a propellant source (18);
at least one turbine (14) operably connected to the propellant source (18) and rotatable by a flow of propellant (16) therefrom; and
at least one electrical generator (20) operably connected to the at least one turbine (14) and the at least two electromechanical actuators (12), the at least one electrical generator (20) configured to convert rotation of the turbine (14) into electrical energy which drives operation of the at least two electromechanical actuators (12).

15. The thrust vector control system of claim 14 wherein the at least one turbine (14) is at least two turbines (14).

16. The thrust vector control system of claim 15 wherein the at least one electrical generator (20) is at least two electrical generators (20), each electrical generator (20) of the at least two electrical generators (20) operably connected to one or more turbines (14) of the at least two turbines (14) and to one or more electromechanical actuators (12) of the at least two electromechanical actuators (12).

17. The thrust vector control system of claim 14 wherein the flow of propellant (16) comprises one of a hydrogen gas vented from a liquid hydrogen propellant tank (18) repressurization system, compressed helium or other gas, solid propellant gas generator, or a liquid propellant.

18. The thrust vector control system of claim 14 further comprising at least one system controller (28) operably connected to the at least one electrical generator (20) configured to control flow of electrical energy to the at least two electromechanical actuators (12).

19. The thrust vector control system of claim 14 further comprising at least one speed control device (24) operably connected to the at least one turbine (14) to control rotation thereof.

20. The thrust vector control system of claim 19 further comprising a propellant control valve (26) operably connected to the at least one speed control device (24) to control a flow rate of the flow of propellant (16) into the at least one turbine (14).

* * * * *